United States Patent
Lin et al.

(10) Patent No.: US 10,958,146 B2
(45) Date of Patent: Mar. 23, 2021

(54) LOW DETENT TORQUE HYBRID STEP MOTOR

(71) Applicant: Lin Engineering, Inc., Morgan Hill, CA (US)

(72) Inventors: Ted T. Lin, Saratoga, CA (US); Guangming Peng, Shanghai (CN)

(73) Assignee: Lin Engineering, Inc., Morgan Hill, CA (US)

( * ) Notice: Subject to any disclaimer, the term of this patent is extended or adjusted under 35 U.S.C. 154(b) by 162 days.

(21) Appl. No.: 16/439,120

(22) Filed: Jun. 12, 2019

(65) Prior Publication Data

US 2020/0313534 A1    Oct. 1, 2020

Related U.S. Application Data

(60) Provisional application No. 62/823,532, filed on Mar. 25, 2019.

(51) Int. Cl.
| | |
|---|---|
| *H02K 37/14* | (2006.01) |
| *H02K 1/04* | (2006.01) |
| *H02K 1/02* | (2006.01) |

(52) U.S. Cl.
CPC ........... *H02K 37/14* (2013.01); *H02K 1/02* (2013.01); *H02K 1/04* (2013.01); *H02K 2201/03* (2013.01)

(58) Field of Classification Search
CPC ..... H02K 1/146; H02K 37/10; H02K 2203/06
USPC .................... 310/49.01, 49.39, 49.41
See application file for complete search history.

(56) References Cited

U.S. PATENT DOCUMENTS

| | | |
|---|---|---|
| 4,234,808 A | 11/1980 | Geppart et al. |
| 4,484,095 A | 11/1984 | Neumann |
| 4,584,495 A | 4/1986 | Kordik |
| 4,593,216 A | 6/1986 | Willcox |
| 4,910,475 A | 3/1990 | Lin |
| 5,068,562 A | 11/1991 | Tagami et al. |
| 5,309,051 A | 5/1994 | Kobori |
| 5,856,714 A | 1/1999 | Sugiura |
| 6,222,286 B1 | 4/2001 | Watanabe et al. |
| 7,518,270 B2 | 4/2009 | Badgerow et al. |
| 9,214,849 B2 | 12/2015 | Lin |
| 10,855,161 B2 * | 12/2020 | Lin .......... H02K 1/246 |
| 2007/0120426 A1 * | 5/2007 | Oiwa ............ H02K 1/2713 |
| | | 310/49.42 |
| 2008/0030108 A1 | 2/2008 | Trago et al. |
| 2011/0304225 A1 * | 12/2011 | Terashita ........ H02K 1/185 |
| | | 310/49.37 |
| 2013/0154405 A1 * | 6/2013 | Trung .............. H02K 37/14 |
| | | 310/49.37 |
| 2013/0249331 A1 * | 9/2013 | Yoshida ......... H02K 37/18 |
| | | 310/49.37 |

(Continued)

*Primary Examiner* — Jose A Gonzalez Quinones
(74) *Attorney, Agent, or Firm* — Thomas Schneck; Mark Protsik

(57) ABSTRACT

A step motor that provides reduced detent torque while maintaining adequate holding torque is characterized by a rotor that includes an annular ring of soft magnetic material (such as medium carbon steel) that surrounds the outer diameter of the rotor permanent magnet and is sandwiched by magnetic insulators of specified axial thickness. This provides a path within the rotor for flux from the permanent magnet in those areas where the radially adjacent stator poles are unenergized, but the magnetic flux can be pulled out by the ampere-turns of energized stator poles.

8 Claims, 7 Drawing Sheets

(56) References Cited

U.S. PATENT DOCUMENTS

| | | | |
|---|---|---|---|
| 2014/0132092 A1* | 5/2014 | Sakamoto | H02K 37/12 310/49.34 |
| 2015/0357894 A1* | 12/2015 | Wu | H02K 1/04 310/49.01 |
| 2016/0079838 A1* | 3/2016 | Yoda | H02K 3/52 310/49.01 |
| 2018/0269763 A1 | 9/2018 | Lin et al. | |

* cited by examiner

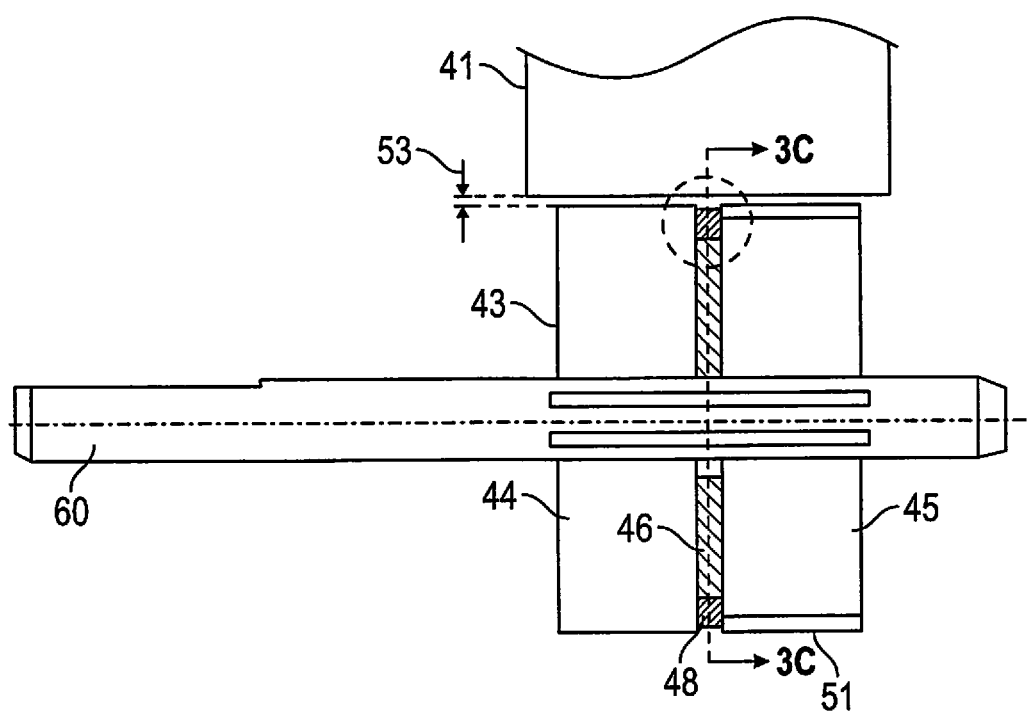
FIG. 3A
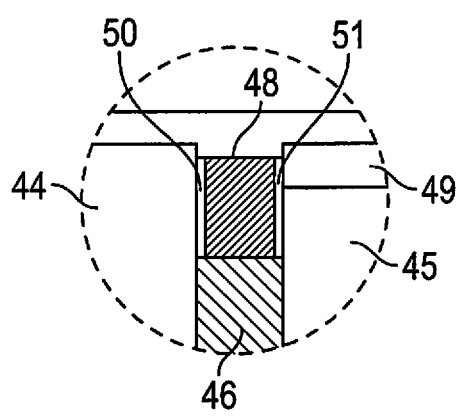
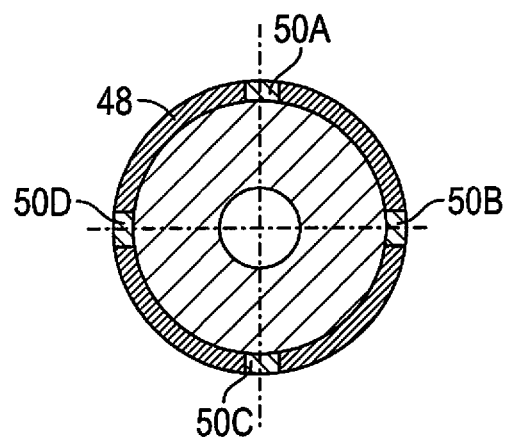
FIG. 3B  FIG. 3C

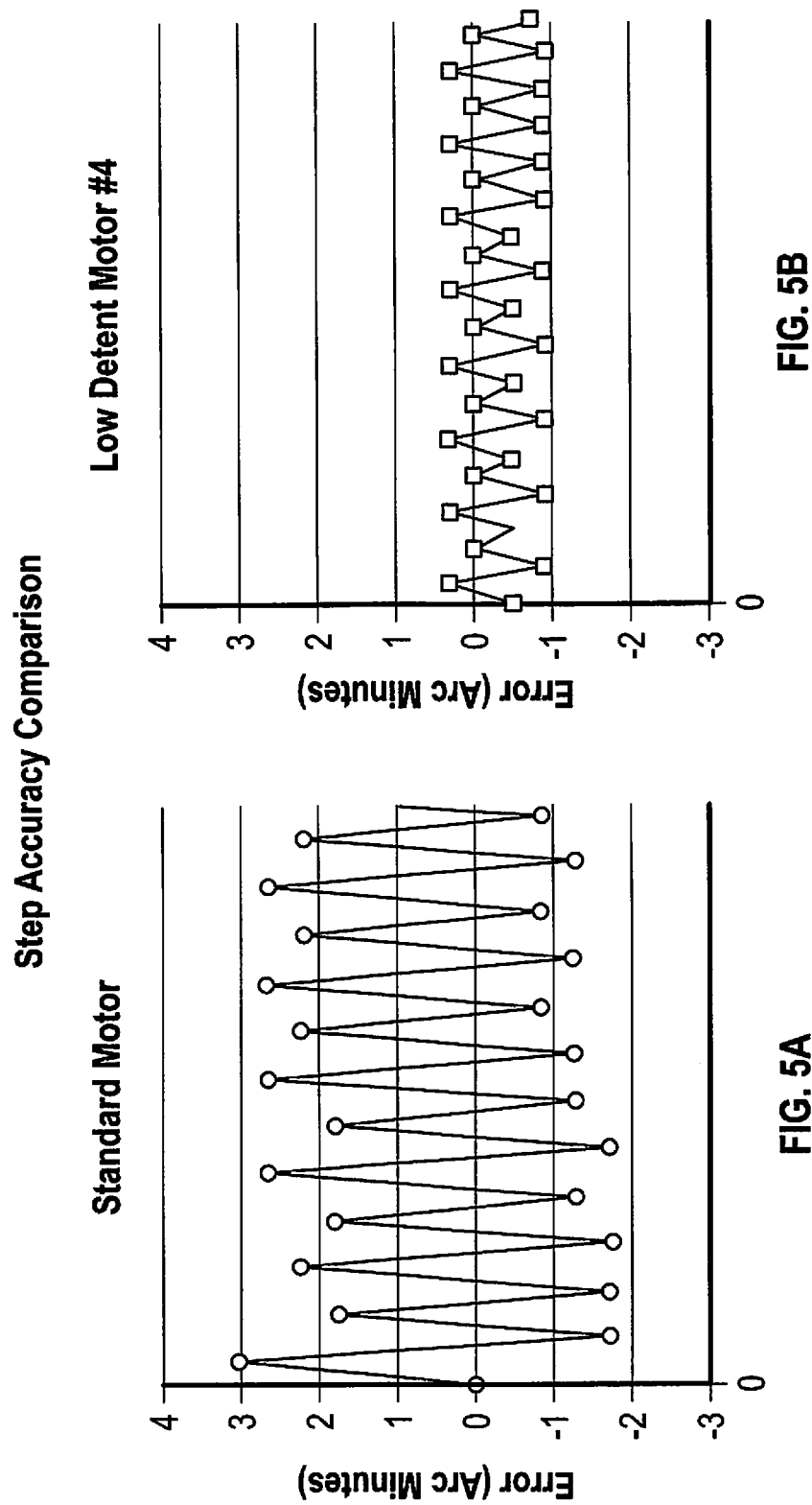

LOW DETENT TORQUE HYBRID STEP MOTOR

CROSS-REFERENCE TO RELATED APPLICATION

The present application claims priority under 35 U.S.C. 119(e) from U.S. provisional application No. 62/823,532 filed on Mar. 25, 2019.

TECHNICAL FIELD

This application relates to step motor designs that endeavor to reduce detent torque while maintaining holding torque.

BACKGROUND ART

A step motor is designed to rotate step-by-step incrementally between discrete stable detent positions defined by electromagnetic interaction between a rotor and those stator poles having energized stator coils. An electrical phase change applying power to a different set of stator coils causes the rotor to "step" to a new detent position. A micro-stepping mode of operation, in which the unequal pull of only partially energized coils causes the rotor to assume intermediate positions between detent positions, allows a full step to be divided into many micro-steps. Step motors are used in a wide variety of applications that require precise motion control.

In the step motor industry, the various design goals (low vibration, smooth quiet operation, fine step resolution, micro-stepping accuracy, small motor size, adequate holding torque, etc.) frequently require tradeoffs in performance such that not all goals can be fully met by any specific motor design. There have been many designs introduced in the motor industry to reduce a motor's un-energized detent torque for smooth operation with low noise and vibration levels. For instance, varying the stator pitch angles is today the most common way to reduce detent torque. Variations of this basic approach are described, for example, in U.S. Pat. No. 4,910,475 to Lin, U.S. Pat. No. 5,309,051 to Kobori, and U.S. Pat. No. 7,518,270 to Badgerow et al. However, the reduction in detent torque also tends to coincide with a reduction in the energized holding torque.

The magnetic coupling between the stator and the rotor inherently creates a natural detent torque in every hybrid stepper so that it is almost impossible to completely eliminate vibration in the stepping motion. Strong magnetism in the air gap between the rotor and stator makes it very difficult to control magnetic flux solely by the Ampere-turns generated with the stator coils.

In U.S. Pat. No. 4,584,495, Kordik describes a step motor designed to provide quicker oscillation damping by means of an electronic back phase damping technique. The rotor comprises a pair of rotor yokes that sandwich an axially polarized rotor magnet. A ring-shaped circumferential zone of the rotor magnet, which would otherwise remain exposed, has windings wound circumferentially around the magnet and connected at opposed ends to form one or more electrically closed loops, forming what is called a "shorted turn" device that improves pull-out torque at a given rotational speed.

In U.S. Pat. No. 5,856,714 to Sugiura and U.S. Patent Application Publication 2008/0030108 of Trago et al., holding torque is enhanced by inserting permanent magnets in the slots or spaces between the stator teeth (and/or rotor teeth). According to Sugiura, the magnets are arranged in such a manner that the direction of magnetic flux is opposite to that present between the rotor and stator, thereby suppressing leakage magnetic flux. In the Trago published application, to allow for machining of the teeth to a precise diameter and also to allow for a corrosion protective coating, the permanent magnet inserts are set back or sub-flushed by a predetermined depth below the top surface of the teeth.

In U.S. Pat. No. 9,214,849, Lin describes a hybrid step motor in which the rotor need not contain any permanent disk magnet. Rather, a permanent ring magnet is sandwiched in an outer part of the stator winding assembly located far from the gap between rotor and stator teeth so that magnetic flux in the gap is dominated by the energized stator coils. The permanent ring magnet remotely magnetizes the rotor with the magnetic flux passing axially through the ring magnet's interior.

SUMMARY DISCLOSURE

The present invention provides a step motor in which the rotor includes an annular ring of soft magnetic material (such as a medium carbon steel) that radially surrounds a permanent rotor magnet, with this annular ring being axially sandwiched by thin magnetic insulators between a pair of rotor sections. The magnetic insulators may be largely composed of air, except for a set of radially distinct plastic film separator strips. Each magnetic insulator has an axial thickness between two and three times the radial air gap distance between rotor and stator teeth.

Accordingly, having reached an understanding of the magnetic flux behavior in the vicinity of the radial gap between rotor and stator teeth, we have re-designed the rotor construction to allow most of the magnetic flux to accumulate inside the rotor wherever the stator poles are not energized to reduce the detent torque. But the accumulated fluxes should be able to be pulled out through the energized stator pole(s) so that no holding torque will be lost. As a result, the new rotor design for the step motor reduces the un-energized detent torque while not reducing much, if any, of the energized torque (commonly called holding torque).

BRIEF DESCRIPTION OF THE DRAWINGS

FIG. 3A is a side sectional view of a step motor in accord with the present invention.

FIG. 3B is a close-up view of within the circle L of FIG. 3A.

FIG. 3C is a sectional view of the step motor taken along line A-A in FIG. 3A.

FIGS. 5A and 5B are graphs of step position errors (in arc minutes) step-by-step for a standard motor of the prior art and a low-detent motor of the present invention, respectively.

DETAILED DESCRIPTION

Figure 1A:
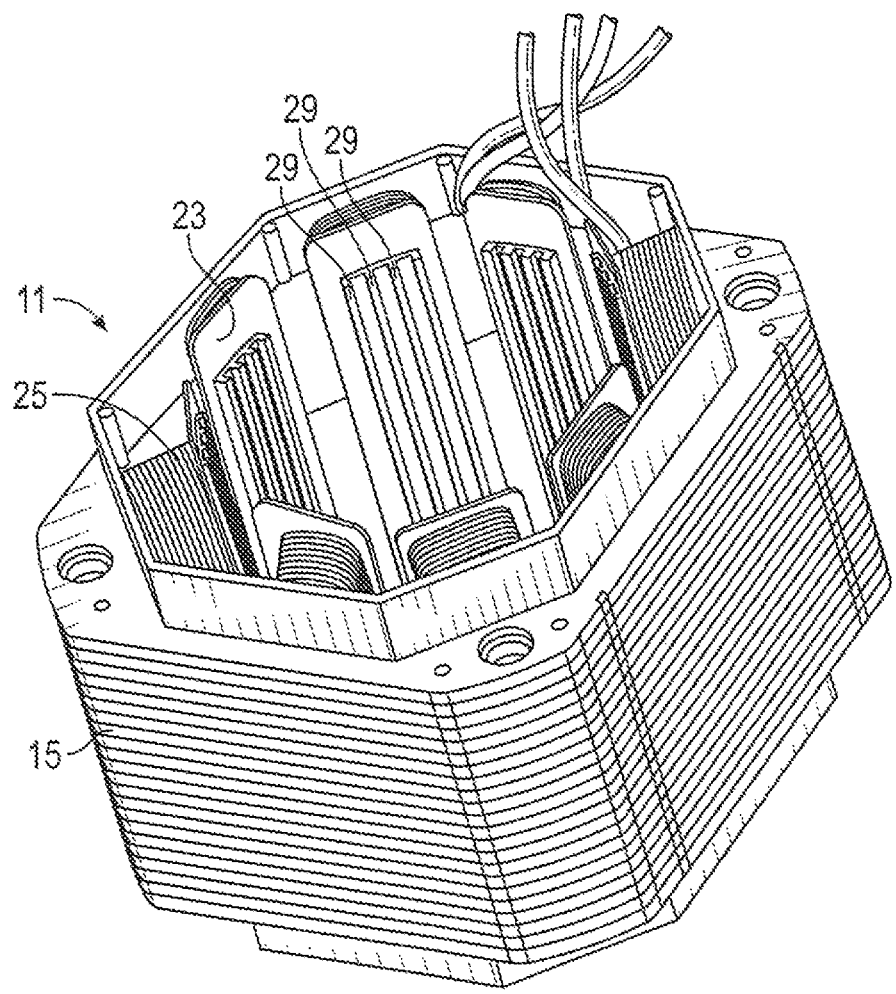
FIGS. 1A-1D are, respectively, a perspective view of the stator winding assembly, a cutaway perspective view of the stator winding assembly with a rotor, a side sectional view of the assembled motor, and an axial plan view of a rotor permanent disc magnet, that together show the basic construction of a conventional step motor.
Figure 1B:
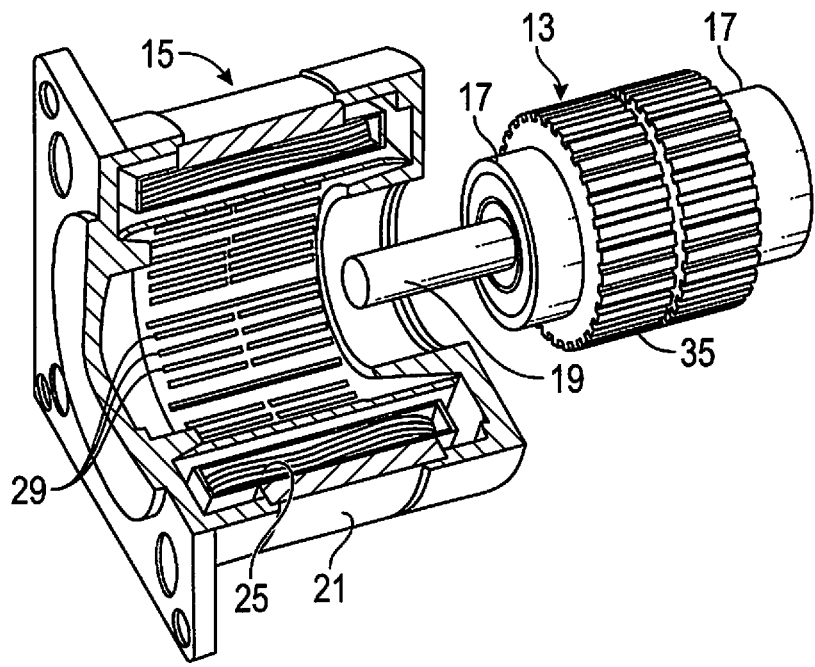

With reference to FIGS. 1A and 1B, a step motor 11 comprises a rotor 13 that fits within a stator winding assembly 15. The rotor 13 is seated by bearings 17 on an axial shaft 19 to rotate within the stator winding assembly 15.

The stator winding assembly 15 includes a stator 21, typically in the form of a laminated stack for ease of machining and assembly. The stator 21 includes a plurality of stator poles 23, each of which is wound with coils 25 that can be selectively driven in a series of phases to magnetically interact 27 with the rotor 13. Each stator pole 25 has a plurality of peripherally spaced, inwardly projecting stator teeth 29 defining a stator inner diameter. The stator teeth 29 magnetically interact with counterpart rotor teeth opposite a gap 39.

Figure 1C:
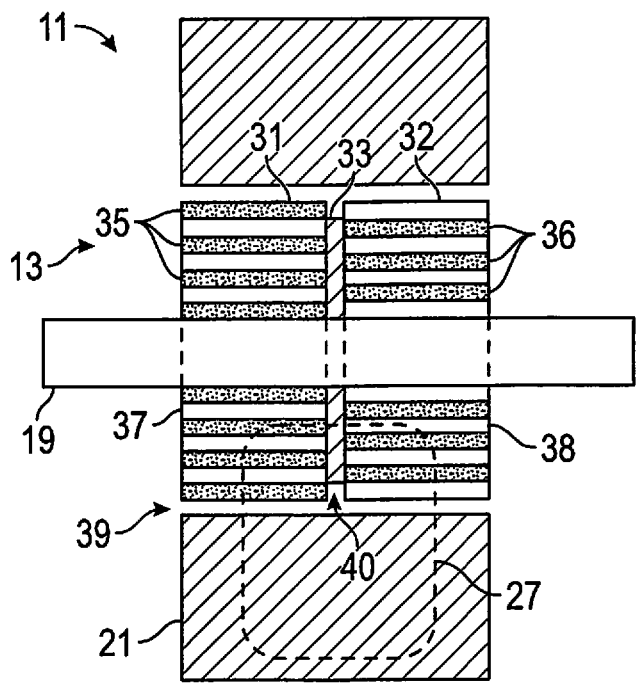
Figure 1D:
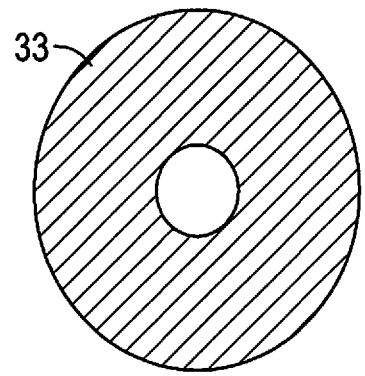

As seen in FIGS. 1B and 1C, a hybrid rotor 13 has two rotor sections 31 and 32 sandwiching a disc permanent magnet 33 (shown in FIG. 1D). Each rotor section 31 and 32 has a plurality of peripherally spaced, outwardly projecting rotor teeth 35 and 36, The rotor teeth 35 and 36 in the two rotor sections 31 and 32 are offset from one another by ½ of the tooth pitch, so that the teeth in one rotor section align with gaps 37 and 38 between the teeth in the other rotor section, and vice versa. The teeth 35 and 36 serve to concentrate the magnetic flux of the rotor magnet 33, which is axially magnetized, so that teeth on one section (e.g. teeth 35 of rotor section 31) are polarized to exhibit magnetic north while the teeth on the other rotor section (e.g. teeth 36 of rotor section 33) exhibit magnetic south. This rotor is mounted on an axial shaft 19.

Figure 2:
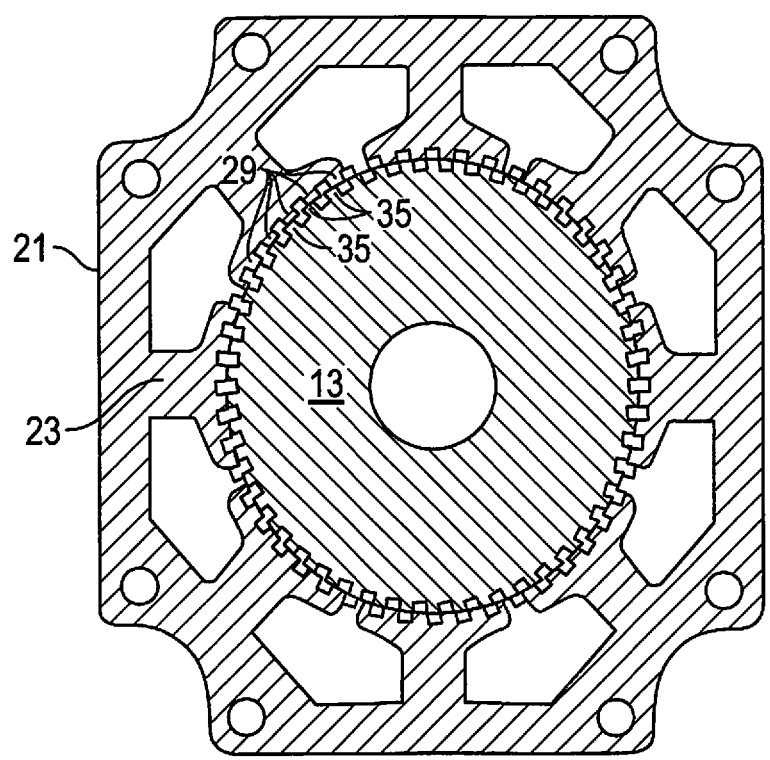
FIG. 2 is a cross-sectional view showing a conventional 200-stepper of the prior art having 8 stator poles and 6 teeth per stator pole. (Ns=48)<(Nr=50)

In the example seen in FIG. 2, a conventional two-phase bipolar step motor has a stator with 8 stator poles and 6 stator teeth per stator pole for a total of 48 stator teeth. The rotor has 50 rotor teeth, creating a 200-stepper with 1.8° full step angle. The number of stator poles, stator teeth per pole, total number of stator teeth, and number of rotor teeth can vary in different step motor embodiments, leading to different step resolutions and different numbers of full steps per revolution. Likewise, as is known, the spacings of stator teeth on a stator pole need not be uniform.

The rotor teeth 35 and 36 interact magnetically with stator teeth 29 of energized stator poles 23 on the opposite side of an air gap 39, thereby impelling the rotor 13 to step incrementally from one position to another as the stator coils 25 around the several poles 23 are energized in a specified sequence of drive phases. In the typical prior art rotor assembly, as in FIGS. 1B and 1C, a ring-shaped circumferential zone around the permanent magnet's 33 outer diameter is exposed to the radial air gap 41, allowing magnetic leakage across that gap to the stator 21 and leading to higher than desired detent torque.

With reference to FIGS. 3A-3C, the present invention provides a soft magnetic steel ring 48 in the ring-shaped circumferential zone surrounding the rotor's 43 permanent disc magnet 46. Additionally, two magnetic insulators 50 and 51 sandwich the permanent magnet 46 between the rotor sections 44 and 45. The magnetic insulator material can be anything (even air will be fine) as long as it is not magnetic conductor. It is important to keep the thickness t of each of the two magnetic insulators to be within $2\ g < t < 3\ g$, where "g" is the air gap between rotor outer diameter (OD) and stator inner diameter (ID). For example, if the air gap g=0.04 mm, the thickness t of each insulator may be 0.10 mm. For this purpose, at least a portion of the magnetic insulator will be made up of thin plastic film separators 50A-50D (as seen in FIG. 3C). The plastic film might be 0.13 mm thick without pressure (i.e. before installation) and be compressed down to 0.10 mm thickness once sandwiched by the rotor sections. The soft magnetic ring 48 may be composed, for example, of a medium carbon steel, such as one that is nominally about 0.45% carbon (Chinese 45# steel, ASTM A29M 1045, EN 10083-2 C45, or equivalents), and typically 0.42% to 0.50% carbon. The thickness m of the magnetic steel ring depends on the thickness T of the permanent rotor magnet being chosen and on the thickness t of the magnetic insulators that sandwich the ring. Thus, $m=(T-2t) \sim (T-4\ g)$. For example, if the disc permanent magnet 46 has a 1.5 mm axial thickness, then the ring 48 might have a 1.3 mm thickness, which together with a 0.1 mm insulator thickness sandwiching each side also totals 1.5 mm axial thickness. The inner and outer diameters of the magnetic steel ring and of the two magnetic insulators can be the same to fit around the permanent magnet outer diameter without interference with the stator inner diameter. The ring and insulator outer diameter can be the same as the rotor outer diameter or more usually slightly inset relative to the tops of the rotor teeth.

Figure 4:
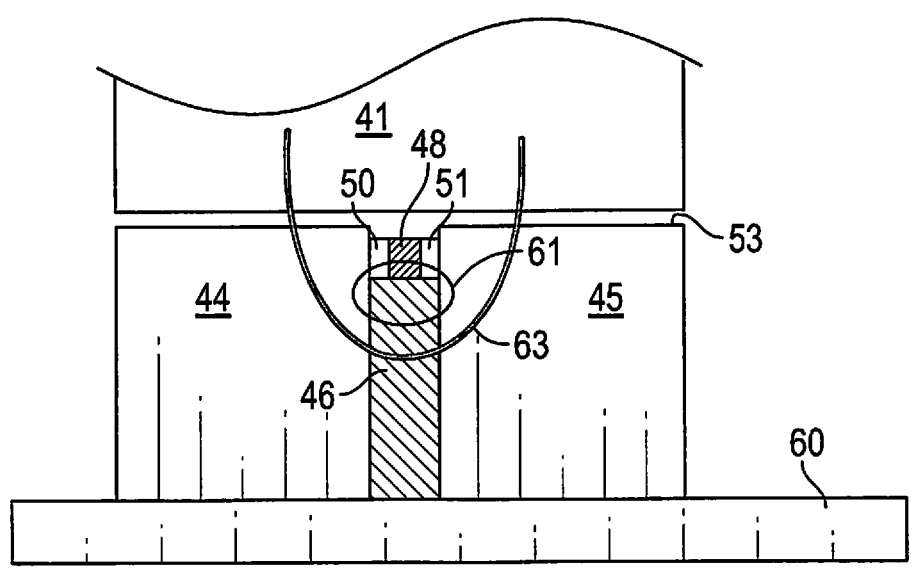
FIG. 4 is a side sectional schematic view of a step motor of the present invention having the magnetic steel ring sandwiched with two pieces of thin magnetic insulators constructed on top of the magnet in the rotor, and illustrating its effect on magnetic flux from the rotor's permanent disc magnet.
Figures 6A, 6B:
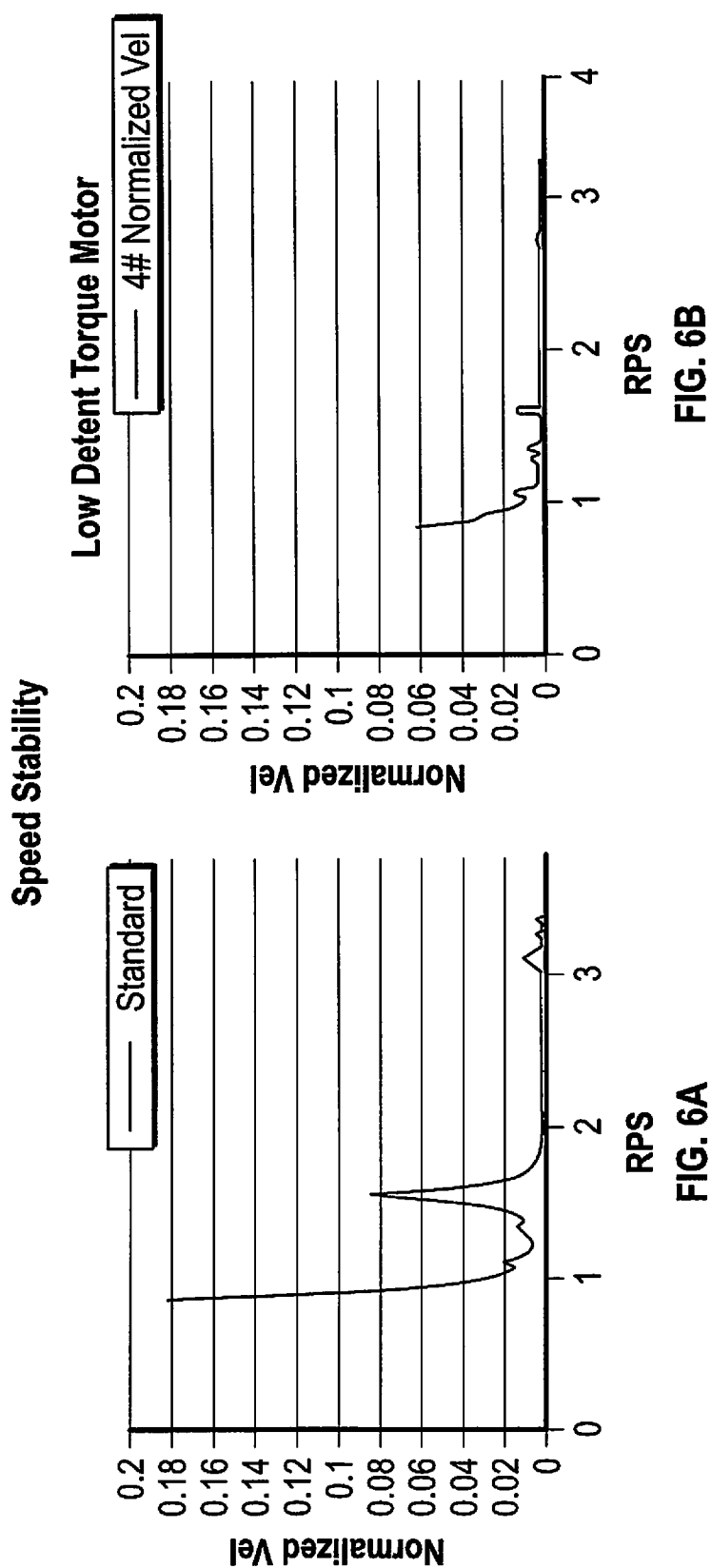
FIGS. 6A and 6B are graphs of normalized step motor velocity versus average revolutions per second (rps) with a driver continuously providing 16 micro-step excitations for a standard motor of the prior art and a low-detent motor of the present invention, respectively.

With reference to FIG. 4, most of the magnetic flux (represented by loop 61) will be circulated through the soft magnetic ring 48 located just outside the outer diameter of the permanent disc magnet 46 (due to the shortest flux path) to reduce the detent torque wherever stator poles are not energized. However, the magnetic flux should be easily pulled out to the stator (represented by curve 63) by the stator windings Ampere-turns wherever stator poles are energized (due to the electro-magnetic force and small air gap) to provide a good holding torque. Accordingly, the magnetic flux from the magnet will release an amount based on the strength of the Ampere-Turn from the stator. Thus, there is no unnecessary flux flowing through un-energized stator poles and it will provide a smooth motion. The invention maximizes the holding torque per detent torque ratio to provide a smooth motion in motion control devices. While the standard hybrid stepper has a ratio from 10 to 30, this invention with its improved rotor assembly can have a substantially larger ratio from 45 up to 65.

As seen in FIGS. 5A, 5B, 6A, and 6B, a prototype made and tested shows a better step position accuracy and better speed stability compared to a standard motor. In FIG. 5A, a standard step motor typically has a step error of around 2 to 3 arc minutes. But as seen in FIG. 5B, a motor with the same basic configuration but now with the addition of the soft magnetic ring and insulators around the rotor permanent magnet has a step error that is reduced to less than 1 arc minute. Likewise, previous step motors typically have a considerable velocity variability from its average. Comparing FIG. 6A (representing this standard prior art step motor) and FIG. 6B (representing a corresponding motor of the present invention), the normalized velocity variability of a step motor continuously run at various micro-stepping speeds shows more than threefold improvement overall with the invention, and even greater improvement at the lower stepping speeds near one revolution per second.

What is claimed is:

1. A step motor, comprising:
 a stator winding assembly with a stator having a plurality of stator poles, each stator pole having a plurality of peripherally-spaced, inwardly-projecting stator teeth thereon defining a stator inner diameter, each stator pole individually wound with the coils connected so as to be electrically activated in a selected series of phases; and
 a rotor fitting within the stator winding assembly and seated by bearings on an axial shaft to rotate within the stator winding assembly, the rotor having a pair of rotor sections sandwiching a permanent magnet, each rotor section each having a plurality of peripherally-spaced, outwardly-projecting rotor teeth thereon that are peripherally offset from rotor teeth on the other rotor section, the rotor teeth defining a rotor diameter and magnetically interacting across an air gap with the stator teeth on activated stator poles to drive the rotor;
 wherein the rotor further includes an annular ring of soft magnetic material radially surrounding the permanent magnet, the ring axially sandwiched by thin magnetic insulators between the pair of rotor sections.

2. A step motor as in claim 1, wherein each of the magnetic insulators axially sandwiching the ring has an axial thickness t between 2 g and 3 g, where g is a radial distance of the air gap between the rotor teeth and stator teeth.

3. A step motor as in claim 2, wherein the ring has an axial thickness m between (T−2t) and (T−4 g), where T is an axial thickness of the permanent magnet and g is a radial distance of the air gap between the rotor teeth and stator teeth.

4. A step motor as in claim 1, wherein the soft magnetic material of the ring comprises a medium carbon steel of 0.42%-0.50% carbon.

5. A step motor as in claim 1, wherein the thin magnetic insulator comprises air.

6. A step motor as in claim 5, wherein the thin magnetic insulator further comprises a set of radially distinct plastic film separator strips provided on both axial sides of the ring.

7. A step motor as in claim 1, wherein the ring and insulators have a radial outer diameter that extends no further than the rotor diameter defined by the rotor teeth.

8. A step motor as in claim 1, wherein the air gap has a radial separation between rotor and stator teeth of 0.04 mm, the permanent magnet has an axial thickness of 1.5 mm, the annular ring has an axial thickness of 1.3 mm, and each of the thin magnetic insulators sandwiching the ring have a thickness of 0.1 mm.

* * * * *